(12) United States Patent
Chen et al.

(10) Patent No.: US 12,375,957 B2
(45) Date of Patent: Jul. 29, 2025

(54) CONTROL CHANNEL CONSTRAINT OF WIRELESS DEVICES

(71) Applicant: ZTE Corporation, Guangdong (CN)

(72) Inventors: Mengzhu Chen, Guangdong (CN); Xiaoying Ma, Guangdong (CN); Qiujin Guo, Guangdong (CN); Xuan Ma, Guangdong (CN); Jun Xu, Guangdong (CN); Qiang Fu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 398 days.

(21) Appl. No.: 17/877,180

(22) Filed: Jul. 29, 2022

(65) Prior Publication Data

US 2022/0377585 A1 Nov. 24, 2022

Related U.S. Application Data

(63) Continuation of application No. PCT/CN2020/107955, filed on Aug. 7, 2020.

(51) Int. Cl.
*H04W 24/08* (2009.01)
*H04L 5/16* (2006.01)
(Continued)

(52) U.S. Cl.
CPC .............. *H04W 24/08* (2013.01); *H04L 5/16* (2013.01); *H04W 72/1273* (2013.01); *H04W 72/23* (2023.01)

(58) Field of Classification Search
CPC ..... H04L 5/001; H04L 5/0053; H04L 5/0091; H04L 5/16; H04W 24/08; H04W 72/1273; H04W 72/23; Y02D 30/70
See application file for complete search history.

(56) References Cited

U.S. PATENT DOCUMENTS

2018/0227102 A1 8/2018 John Wilson et al.
2019/0150148 A1* 5/2019 Ouchi ................... H04L 1/1854
370/336
(Continued)

FOREIGN PATENT DOCUMENTS

CN 110166203 A 8/2019
CN 110167036 A 8/2019
(Continued)

OTHER PUBLICATIONS

"UE procedure for receiving control information," 3GPP TS 38.213 V15.9.0, Release 15, Mar. 2020.
(Continued)

*Primary Examiner* — Shah M Rahman
(74) *Attorney, Agent, or Firm* — Perkins Coie LLP

(57) ABSTRACT

Disclosed in this patent document are, among other things, techniques, and apparatuses for improving the efficiency of wireless communication. In one aspect, a method of wireless communication is disclosed. The method includes determining, by a wireless node, a control channel monitoring constraint based on a first condition. The method further includes monitoring, by the wireless device, one or more control channel candidates at a control channel monitoring occasion, wherein a maximum number of the control channel candidates within a resource unit or a maximum number of non-overlapped control channel elements within a resource unit satisfies the control channel monitoring constraint.

20 Claims, 8 Drawing Sheets

(51) Int. Cl.
  *H04W 72/1273* (2023.01)
  *H04W 72/23* (2023.01)

(56) References Cited

U.S. PATENT DOCUMENTS

| | | | |
|---|---|---|---|
| 2019/0223164 A1 | 7/2019 | He et al. | |
| 2019/0253308 A1 | 8/2019 | Huang et al. | |
| 2020/0154413 A1 | 5/2020 | Hosseini et al. | |
| 2020/0221379 A1 | 7/2020 | Choi et al. | |
| 2020/0221449 A1 | 7/2020 | Bang et al. | |
| 2021/0029726 A1* | 1/2021 | Papasakellariou | H04L 5/0053 |
| 2021/0037607 A1* | 2/2021 | Hamidi-Sepehr | H04W 24/08 |
| 2021/0084620 A1* | 3/2021 | Tooher | H04W 72/566 |
| 2021/0105105 A1* | 4/2021 | Xu | H04L 5/0094 |
| 2021/0250153 A1* | 8/2021 | Lin | H04W 72/23 |
| 2021/0321366 A1* | 10/2021 | Hosseini | H04L 5/0092 |
| 2021/0360593 A1* | 11/2021 | Hosseini | H04W 76/15 |
| 2022/0182860 A1* | 6/2022 | Chatterjee | H04L 5/0007 |
| 2022/0201515 A1* | 6/2022 | Chatterjee | H04L 5/0007 |
| 2022/0303800 A1* | 9/2022 | He | H04L 1/0038 |
| 2022/0338039 A1* | 10/2022 | Takahashi | H04L 27/26025 |
| 2022/0345920 A1* | 10/2022 | Liu | H04W 24/08 |
| 2023/0125672 A1* | 4/2023 | Grossmann | H04L 5/0053 |
| 2023/0141339 A1* | 5/2023 | Kittichokechai | H04W 24/08 370/329 |

FOREIGN PATENT DOCUMENTS

| | | |
|---|---|---|
| CN | 110268672 A | 9/2019 |
| CN | 110324127 A | 10/2019 |
| CN | 110830216 A | 2/2020 |
| CN | 110832919 A | 2/2020 |
| CN | 111096018 A | 5/2020 |
| JP | 2019220742 A | 12/2019 |
| WO | 2019160498 A1 | 8/2019 |
| WO | 2020041757 A1 | 2/2020 |

OTHER PUBLICATIONS

NEC, "View on reduced PDCCH monitoring for NR devices," 3GPP TSG RAN WG1 #101-e, R1-2003711, e-Meeting, May 25-Jun. 5, 2020 (2 pages).

Office Action for Chinese Patent Application No. 202080104168.0, mailed Mar. 18, 2024, with English summary (23 pages).

Huawei, "Summary for WI on Physical layer enhancements for NR ultra-reliable and low latency case (URLLC)," 3GPP TSG RAN #88-e, e-Meeting, RP-200887, 3 pages, Jun. 29-Jul. 3, 2020.

3GPP, "3rd Generation Partnership Project; Technical Specification Group Services and System Aspects; Release 16 Description; Summary of Rel-16 Work Items (Release 16)," 3GPP TR 21.916 V0.5.0, Jul. 2020.

International Search Report and Written Opinion for International Application No. PCT/CN2020/107955, mailed on Apr. 29, 2021 (8 pages).

CATT, "PDCCH enhancements for URLLC," 3GPP TSG RAN WG1 Meeting #98, R1-1908594, Prague, CZ, Aug. 26-30, 2019 (14 pages).

ZTE, "On PDCCH enhancements for NR URLLC," 3GPP TSG RAN WG1 #97, R1-1906409, Reno, USA, May 13-17, 2019 (12 pages).

Notification of Registration and Grant for Chinese Patent Application No. 202080104168.0, mailed Sep. 27, 2024 (7 pages).

* cited by examiner

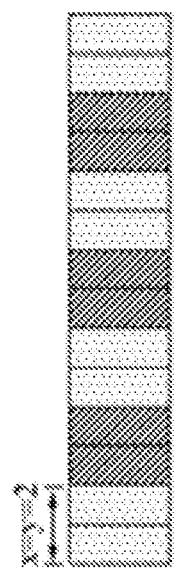
FIG. 1A
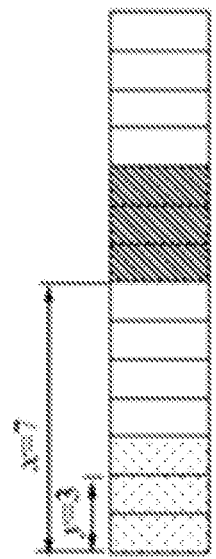
FIG. 1B
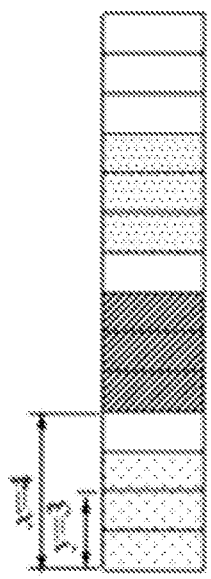
FIG. 1C
FIG. 1D

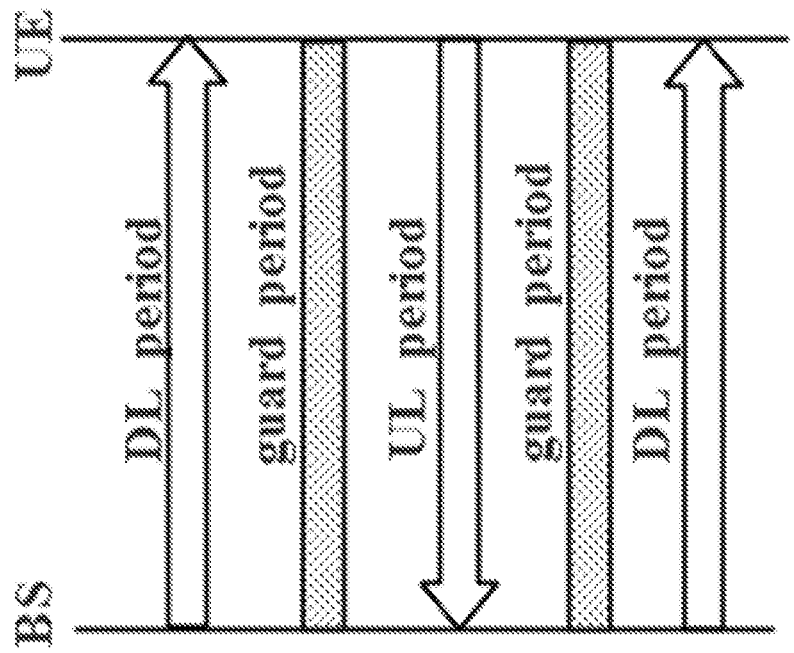
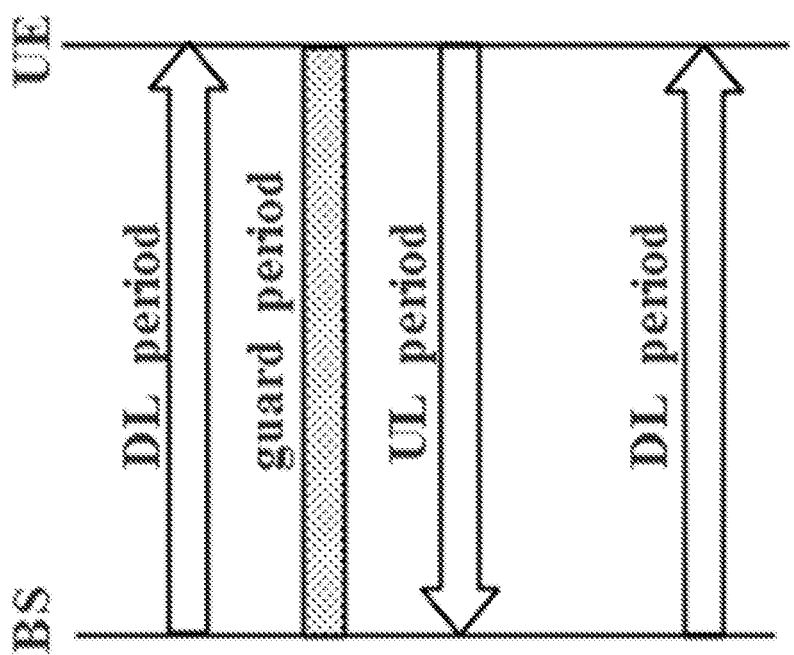
FIG. 4

500

Determining, by a wireless node, a control channel monitoring constraint based on a first condition — 510

Monitoring, by the wireless device, one or more control channel candidates at a control channel monitoring occasion, wherein a maximum number of the control channel candidates within a resource unit or a maximum number of non-overlapped control channel elements within a resource unit satisfies the control channel monitoring constraint — 520

610 Determining, by a network node, a control channel monitoring constraint based on a first condition

620 Transmitting, by the network node, one or more control channel candidates satisfying the control channel monitoring constraint, wherein a maximum number of the control channel candidates within a resource unit or a maximum number of non-overlapped control channel elements within a resource unit satisfies the control channel monitoring constraint

FIG. 6

CONTROL CHANNEL CONSTRAINT OF WIRELESS DEVICES

CROSS REFERENCE TO RELATED APPLICATIONS

This patent document is a continuation of and claims benefit of priority to International Patent Application No. PCT/CN2020/107955, filed on Aug. 7, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques, and apparatuses for improving the efficiency of wireless communication.

In one aspect, a method of wireless communication is disclosed. The method includes determining, by a wireless device, a control channel monitoring constraint based on a first condition. The method further includes monitoring, by the wireless device, one or more control channel candidates at a control channel monitoring occasion. A maximum number of the control channel candidates within a resource unit or a maximum number of non-overlapped control channel elements within a resource unit satisfies the control channel monitoring constraint.

In another aspect, another method of wireless communication is disclosed. The method includes determining, by a network node, a control channel monitoring constraint based on a first condition. The method further includes transmitting, by the network node, one or more control channel candidates satisfying the control channel monitoring constraint. A maximum number of the control channel candidates within a resource unit or the maximum number of non-overlapped control channel elements within a resource unit satisfies the control channel monitoring constraint.

These, and other, aspects are described in the present document.

BRIEF DESCRIPTION OF DRAWINGS

FIG. 1A shows an example of a span and FIGS. 1B-1D show examples of symbols (X,Y).

FIG. 4 shows an example of a Type A half-duplex frequency division duplexing (HD-FDD) and a Type B HD-FDD.

FIG. 5 shows an example of a method performed at a wireless device.

FIG. 6 shows an example of a method performed at a network device.

DETAILED DESCRIPTION

Figure 2:
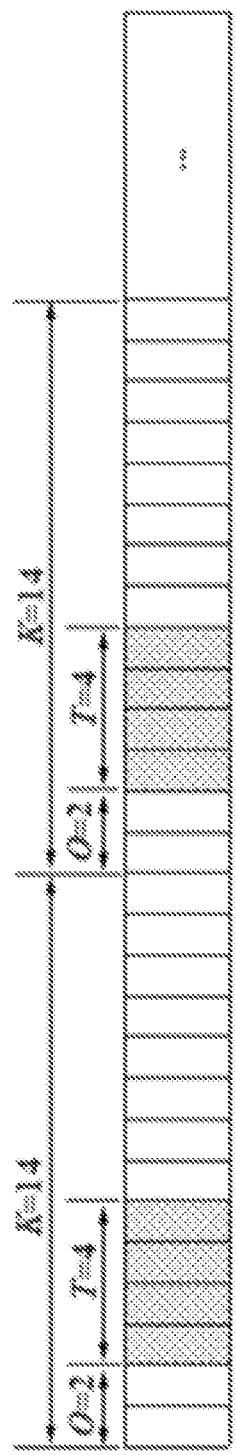
FIG. 2 shows an example of a search space set with K=14 slots, O=2 slots, T=4 slots.

Certain features are described using the example of Fifth Generation (5G) wireless protocol. However, applicability of the disclosed techniques is not limited to only 5G wireless systems. Headings are used in the following description only to aid understanding without limiting the features described.

Monitoring the physical downlink channel control channel (PDCCH) is a contributor to the power consumption of a wireless device (also referred to herein as a user equipment or UE). When the UE monitors PDCCH, the UE monitors a set of PDCCH candidates in one or more control resource set (CORESET) on the active downlink (DL) bandwidth part (BWP) on activated serving cell configured with PDCCH monitoring according to corresponding search space sets. Where monitoring implies decoding PDCCH candidate according to the monitored DCI formats. Hence, the PDCCH monitoring consumes UE power in the receiver and baseband. By monitoring fewer resources, power can be conserved and the implementation complexity can be reduced. To reduce UE power consumption as well as the processing complexity, the maximum number of monitored PDCCH candidate resources and/or non-overlapped control channel elements (CCEs) can be reduced.

In the current specification, maximum number of PDCCH candidates and/or non-overlapped CCEs are defined for Enhanced Mobile Broadband (eMBB) UE or Ultra-reliable and Low Latency Communications (URLLC) UE. When a UE with reduced or limited capability is introduced, the corresponding maximum number of PDCCH candidates and/or non-overlapped CCEs needs to be defined.

In some example embodiments, the wireless device determines a control channel (PDCCH) monitoring constraint monitoring constraint based on a first condition. The wireless device monitors one or more PDCCH candidates at a PDCCH monitoring occasion. The maximum number of the PDCCH candidates within a resource unit and/or the maximum number of non-overlapped CCEs within a resource unit fulfills the PDCCH monitoring constraint.

In some example embodiments, the network node determines a control channel (PDCCH) monitoring constraint based on a first condition. The network node transmits one or more control channel candidates satisfying the control channel monitoring constraint. Wherein a maximum number of the control channel candidates within a resource unit and/or a maximum number of non-overlapped control channel elements within a resource unit satisfies the control channel monitoring constraint.

In some embodiments, the PDCCH monitoring constraints include at least one of a first PDCCH monitoring constraint, a second PDCCH monitoring constraint, or a third PDCCH monitoring constraint.

In some embodiments, the resource unit of the control channel monitoring constraint is defined by at least one of a span, an aggregation level, a search space type, a control resource set or a transmission direction.

To reduce the complexity of blind decoding at the UE, the maximum number of PDCCH candidates and/or non-overlapped CCEs is restricted.

There are two types of PDCCH monitoring constraints (the second PDCCH monitoring constraint and third PDCCH monitoring constraint) that may be defined in a standard. However, when a type of UE with reduced or limited capability is introduced, the exiting restriction defined in the standard may be beyond what the UE with reduced or limited capability can accommodate. Hence, the first PDCCH monitoring constrains is defined for the UE with reduced or limited capability.

Span of a First PDCCH Monitoring Constraint

In some embodiments, the resource unit is different for at least two of the first PDCCH monitoring constraint, the second PDCCH monitoring constraint and the third PDCCH monitoring constraint.

In some embodiments, the resource unit of the second PDCCH monitoring constraint is a second span. For example, the second span is one slot.

In some embodiments, the second PDCCH monitoring constraint includes the maximum number of PDCCH candidates per slot.

In some embodiments, the second PDCCH monitoring constraint includes the maximum number of non-overlapped CCEs per slot.

In some embodiments, the second PDCCH monitoring constraint is applied to a DL active BWP of a serving cell.

In some embodiments, the resource unit of the third PDCCH monitoring constraint is defined by a third span. For example, the duration of the third span be is no less than Y symbols, and the gap between the first symbol of two consecutive spans is no less than X symbols, and (X,aY)= (2,2)symbols, (4,3)symbols or (7,3)symbols. See FIG. 1A for an example of a span. See FIGS. 1B-1D for examples of symbols (X,Y).

In some embodiments, the third PDCCH monitoring constraint includes the maximum number of monitored PDCCH candidates in the third span.

In some embodiments, the third PDCCH monitoring constraint includes the maximum number of non-overlapped CCEs in the third span.

In some embodiments, the third PDCCH monitoring constraint is applied to a DL active BWP of a serving cell.

In some embodiments, the resource unit of the first PDCCH monitoring constraint is defined by a first span.

In some embodiments, the first PDCCH monitoring constraint includes the maximum number of monitored PDCCH candidates in the first span.

In some embodiments, the first PDCCH monitoring constraint includes the maximum number of non-overlapped CCEs in the first span.

In some embodiments, at least one of the first PDCCH monitoring constraint, the second PDCCH monitoring constraint or the third PDCCH monitoring constraint is applied to or associated with an active search space set group and/or a predefined search space set group of DL active BWP of a serving cell.

In some embodiments, a search space set group is comprised of one or more search space set configured with the same group identifier.

In some embodiments, the active search space set group is the search space set group in which UE monitors PDCCH.

In some embodiments, the inactive or de-activated search space set group is the search space set group in which UE does not monitor PDCCH.

In some embodiments, the predefined space set group includes at least one of the following search space set:
   Type0-PDCCH common search space set,
   Type0A-PDCCH common search space set,
   Type1-PDCCH common search space set,
   Type2-PDCCH common search space set,
   Type3-PDCCH common search space set that is not associated with a search space set group or a search space set group identifier, or
   UE-specific search space set that is not associated with a search space set group or a search space set group identifier.

In the foregoing embodiments, the UE can be configured with one or more search space set group. UE can be indicated or triggered by timer to switch search space set group. For example, if UE is indicated to switch to search space set group with identifier 1, UE starts monitoring PDCCH candidates according to the search space sets in search space set group with identifier 1, and stops monitoring PDCCH candidates according to the search space sets in search space set group with identifier other than 1.

In some embodiments, the search space set group includes Type3-PDCCH search space set and UE specified search space set.

In some embodiments, the duration of the first span is no less than A, and the gap between two consecutive spans is no less than B. Wherein A and B are non-negative values. The gap can be determined by the start or end of two consecutive spans or an end of a former span and a start of a later span. In some example, the first span (e.g., duration and/or gap) is in the unit of at least one of the following: symbol, slot, millisecond, subframe, system frame.

In some embodiments, the first span is determined by a first scaling factor (e.g., $\alpha 1$ or $\alpha 2$) and one of the second span or the third span.

In some embodiments, the duration of the first span is determined by a first scaling factor (e.g., $\alpha 1$ or $\alpha 2$) and the duration of one of the second span or the third span.

In some embodiments, the gap of the first span is determined by a first scaling factor (e.g., $\alpha 1$ or $\alpha 2$) and the gap of one of the second span or the third span.

For example, the first span is determined by operation ($\alpha 1$*second span), In some example, the operation can be round, floor or ceiling. For example, the first span is determined by operation ($\alpha 1$*third span). In some example embodiments, the operation can be round, floor or ceiling. In the first scaling factor $\alpha 1$ is a non-negative value. For example, the first scaling factor $\alpha 1$ is no less than 1.

For example, the first span is determined by ($\alpha 2$+second span) or ($\alpha 2$+third span). Wherein in the first scaling factor $\alpha 2$ is a non-negative value.

In some embodiments, the first span of the first PDCCH monitoring constrain is the same with the second span of the second PDCCH monitoring constrain.

For the UE with reduced or limited capability, the requirement of PDCCH blind decoding times and/or non-overlapped CCEs is more relaxed compared with the second/third PDCCH monitoring constraints. Hence, the span of the relaxed PDCCH monitoring constraint (i.e., the first PDCCH monitoring constraint) can be extended with the help of a first scaling factor $\alpha 1$ or $\alpha 2$.

In some embodiments, the first span is determined by one or more search space set.

In some embodiments, the first span is determined by one or more search space set in search space set group and/or the predefined search space set group.

In some embodiments, the first span is determined by one or more search space set of UE-specific search space set.

For example, the first span is determined by at least one of the periodicity, duration of the one or more search space set. For example, the first span is determined by the minimum or maximum the periodicity of the one or more search space set. For example, the first span is determined by the minimum or maximum the duration of the one or more search space set.

In some example embodiments, the UE monitors PDCCH candidates according to the configuration of search space set and control resource set (CORESET). Hence, the first span can be defined by the parameters associated with search space set. The configuration of search space set includes periodicity and duration. And UE can be configured with one or more search space set(s), the span can be determined by the minimum or maximum value of the parameters. Also, the search space set can be configured as common or UE-specific search space set. As the common search space set can be used for one or more UE, UE-specific search space set can be considered to define the span.

In some embodiments, the configuration of search space set can include one or more of the following parameters.
- a PDCCH monitoring periodicity of K slots and a PDCCH monitoring offset of O slots,
- a PDCCH monitoring pattern within a slot, indicating first symbol(s) of the CORESET within a slot for PDCCH monitoring, by monitoringSymbolsWithinSlot
- a duration of T slots indicating a number of slots that the search space set exists FIG. 2 shows an example of a search space set with K=14 slots, O=2 slots, T=4 slots.

Other Methods to Define the First PDCCH Monitoring Constraint

In some embodiments, the resource unit of first PDCCH monitoring constraint is at least one of the aggregation level, search space type, CORESET or transmission direction.

For example, the resource unit of first PDCCH monitoring constraint is at least the aggregation level. In some embodiments, the first PDCCH monitoring constraint includes "the maximum number of monitored PDCCH candidates for an aggregation level." In some embodiments, the first PDCCH monitoring constraint includes the non-overlapped CCEs for an aggregation level. The aggregation level is a positive value. For example, the aggregation level can be 1, 2, 4, 8, or 16. For example, for the first PDCCH monitoring constraints, a maximum number of the PDCCH candidates of an aggregation level and/or the maximum number of non-overlapped CCEs of an aggregation level is defined. For example, for the aggregation level L the maximum number of PDCCH monitoring candidates is M. Wherein L and M are non-negative numbers. For example, for the aggregation level L, the maximum number of non-overlapped CCEs is C, wherein C is a non-negative number. In some embodiments, the maximum number of downlink control information (DCI) sizes of PDCCH candidates is limited to S. In some embodiments, S=2. In some embodiments, one DCI size is for scheduling DCI, the other DCI size is for non-scheduling DCI. In some embodiments, one DCI size is for DCI in common search space set (CSS), the other DCI size is for DCI in UE-specific search space set (USS). In this example, the number of DCI sizes is limited, then the maximum number of blind decoding of PDCCH candidates can also be limited by restricting the candidates for each aggregation level.

In some embodiments, the priority of the allocation of the PDCCH candidates is determined by at least one of higher layer signaling, aggregation level, search space type, or index of search space set.

For example, the resource unit of first PDCCH monitoring constraint is defined by at least search space set type. In some embodiments, the first PDCCH monitoring constraint includes the maximum number of monitored PDCCH candidates for a search space set type. In some embodiments, the first PDCCH monitoring constraint includes "the maximum number of non-overlapped CCEs for a search space set type". In some embodiments, the search space set type can be at least one of the common search space, UE-specific search space. Wherein the common search space includes at least one of Type-0/0A/1/2/3 PDCCH common search space (CSS) set. For example, for the first PDCCH monitoring constraint, a maximum number of PDCCH candidates for common search space and/or UE-specific search space is defined.

For example, the resource unit of first PDCCH monitoring constraint is defined by at least CORESET. In some embodiments, the first PDCCH monitoring constraint includes "the maximum number of monitored PDCCH candidates for a CORESET". In some embodiments, the first PDCCH monitoring constraint includes "the maximum number of non-overlapped CCEs for a CORESET".

In some embodiments, a Type0-PDCCH CSS set is used for a DCI format with Cyclic Redundancy Check (CRC) scrambled by Radio Network Tempory Identity (RNTI) includes a SI-RNTI on the primary cell of the master cell group (MCG). In some embodiments, a Type0A-PDCCH CSS set is used for a DCI format with CRC scrambled by RNTI includes a SI-RNTI on the primary cell of the MCG. In some embodiments, a Type1-PDCCH CSS set is used for a DCI format with CRC scrambled by RNTI includes RA-RNTI, a MsgB-RNTI, or a TC-RNTI on the primary cell. In some embodiments, a Type2-PDCCH CSS set is used a DCI format with CRC scrambled by at least one of P-RNTI on the primary cell of the MCG. In some embodiments, a Type3-PDCCH CSS set is used for DCI formats with CRC scrambled by RNTI includes INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s).

For example, the first PDCCH monitoring constraint includes "the maximum number of PDCCH candidates for a data scheduling of a transmission direction". For example, the first PDCCH monitoring constraint includes "the maximum number of non-overlapped CCEs for a data scheduling of a transmission direction". For example, for the first PDCCH monitoring constraints, a maximum number of PDCCH candidates/non-overlapped CCEs for DL and/or UL scheduling is defined.

In some embodiments, the priority of the allocation of the PDCCH candidates determined by at least one of higher layer signaling, transmission direction, search space type, or index of search space set.

First PDCCH Monitoring Constraint

In some embodiments, the maximum number of PDCCH candidates of the first PDCCH monitoring constrain is determined by a second scaling factor (e.g., β1 or β2) and/or one of the maximum number of PDCCH candidates of the second monitoring PDCCH constrain or the third PDCCH monitoring constrain. Wherein the scaling factor β1, β2 are a non-negative number.

In some embodiments, the maximum number of non-overlapped CCEs of the first PDCCH monitoring constrain is determined by a third scaling factor (e.g., γ1 or γ2) and/or one of maximum number of non-overlapped CCEs of the second monitoring PDCCH constrain or the third PDCCH monitoring constrain. Wherein the scaling factor γ1, γ2 are a non-negative number.

For example, the scaling factor β1 and/or γ1 is no larger than 1.

In some embodiments, the maximum number of monitored PDCCH candidates of the first PDCCH monitoring constraint is determined by operation (β1*maximum number of PDCCH candidates of the second or third PDCCH monitoring constraint). In some embodiments, the operation can be round, floor or ceiling. In some embodiments, the maximum number of monitored PDCCH candidates of the first PDCCH monitoring constraint is determined by operation (maximum number of PDCCH candidates of the second or third PDCCH monitoring constraint-β2).

In some embodiments, the maximum number of non-overlapped CCEs of the first PDCCH monitoring constraint is determined by operation (γ1*maximum number of non-overlapped CCEs of the second or third PDCCH monitoring constraint). In some embodiments, the operation can be round, floor or ceiling. In some embodiments, the maximum number of non-overlapped CCEs of the first PDCCH monitoring constraint is determined by operation (maximum number of non-overlapped CCEs for the second or third PDCCH monitoring constraint-γ2).

For the UE with reduced or limited capability, the requirement of PDCCH blind decoding times and/or non-overlapped CCEs is more relaxed compared with the second/third PDCCH monitoring constraints. Hence, the PDCCH blind decoding times and/or non-overlapped CCEs of the relaxed PDCCH monitoring constraint (i.e., the first PDCCH monitoring constraint) can be reduced with the help of a scaling factor β, γ.

Examples of Scaling Factor (α1, β1, γ1, α2, β2, γ2)

In some embodiments, at least one of the first scaling factor, the second scaling factor, or the third scaling factor (e.g., at least one of the α1, β1, γ1, α2, β2, γ2) is associated with at least one of the following factors:
  Subcarrier spacing;
  Frequency range;
  Higher layer parameter. In some embodiments, the higher layer parameter can be RRC parameter and/or MAC CE;
  DCI or DCI format. For example, the DCI includes at least one of the DCI format 0_1/0_2/1_1/1_2/2_0/2_6;
  RNTI;
  UE capability;
  Repetition times of a physical channel/signal;
  Coverage enhancement operation.

In some embodiments, the physical channel includes at least one of Physical downlink shared channel (PDSCH), PDCCH, Physical uplink shared channel (PUSCH), Physical uplink control channel (PUCCH), Physical random access channel (PRACH). In some embodiments, the physical signal includes at least one of Channel state information—Reference signal (CSI-RS), Sounding reference signal (SRS), Secondary synchronization signal (SSS), Primary synchronization signal (PSS).

In some embodiments, at least one of the scaling factors is associated with at least subcarrier spacing, and higher layer parameter. In some embodiments, at least one of the scaling factors is associated with at least UE capability subcarrier spacing, and higher layer parameter. For example, at least one of the scaling factors is configured by the higher layer parameter. In some embodiments, at least one of the scaling factors is associated with a higher layer parameter and DCI. For example, a list of scaling factors is configured by higher layer parameter. The DCI indicates one of scaling factor in the list. In another example, the higher layer parameter is used to enable or disable the information field of scaling factor in the DCI.

In some embodiments, a default value of at least one of the first scaling factor, the second scaling factor, or the third scaling factor is applied when at least one of the following conditions is fulfilled.
  after radio resource control (RRC) configuration/RRC reconfiguration/random access procedure
  before an indication of scaling factor is received. Wherein the indication can be carrier by DCI or MAC CE.
  More than one scaling factors are indicated by higher layer signaling. Wherein the higher layer signaling is RRC signaling or MAC CE.
  before an indication of a scaling factor is received in an activated BWP. Wherein the indication can be carrier by DCI or MAC CE.
  Expiration/start/restart of a timer In some embodiments, at least one of the scaling factors is not applied until an application delay X. In some embodiments, at least one of the scaling factors is not applied before a first boundary that is X after the second boundary.

Figure 3:
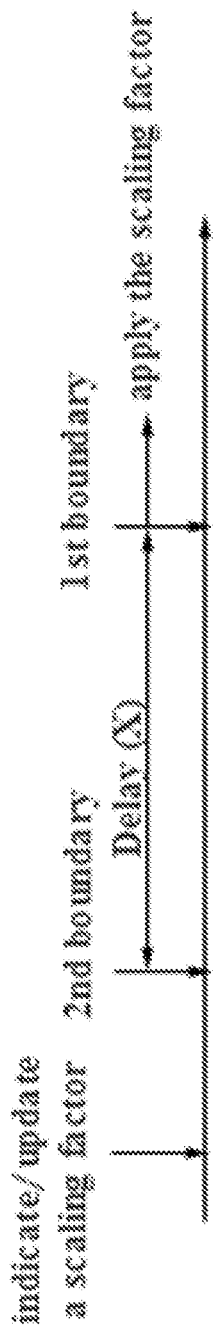
FIG. 3 shows an example of a delay (X) and first and second boundaries.

FIG. 3 shows an example of an application delay (X) and first and second boundaries.
  In some embodiments, the second boundary is one of
  the start/end of the symbol/slot/subframe/frame where the DCI/MAC CE is received or the timer is started/restarted/expired
  the start/end of the cycle of the search space set where the DCI is received
  the start/end of the largest/smallest cycle of the search space sets
  In some embodiments, the first boundary is one of the start/end of a symbol/slot/subframe/frame
  In some embodiments, the application delay (X) is associated with at least one of the following factors:
  Subcarrier spacing. In some embodiments, the subcarrier space is a reference subcarrier spacing. In some embodiments, the reference subcarrier spacing can be the smallest/largest subcarrier spacing among a group. In some embodiments, the group is all the active BWP of a serving cell group. In some embodiments, the group is all the active DL BWP of a serving cell group. In some embodiments, the group is all the BWP of a serving cell. In some embodiments, the reference subcarrier spacing is the subcarrier spacing of a DL active BWP of a serving cell.
  Higher layer parameter (e.g., RRC parameter, or MAC CE)
  A frequency range.
  UE capability
  Processing time. Wherein the processing time includes PDCCH decoding time.
  Minimum scheduling offset restriction (at least one of the minK0 or minK2)

Application delay of the minimum scheduling offset restriction.

In some embodiments, the delay (X) is associated with at least subcarrier spacing, and higher layer parameter. In some embodiments, the delay (X) is associated with at least subcarrier spacing, and UE capability. In some embodiments, the delay (X) is associated with at least UE capability, subcarrier spacing, and higher layer parameter. In some embodiments, the delay (X) is associated with at least processing time, and higher layer parameter.

An Example Embodiment

In some standards, the maximum number of PDCCH candidates shown in Table 1 is the maximum number of PDCCH candidates of the second PDCCH monitoring constrain.

In some standards, the maximum number of non-overlapped CCEs shown in Table 2 is the maximum number of non-overlapped CCEs of the second PDCCH monitoring constrain.

The maximum number of PDCCH candidates shown in Table 1A is the maximum number of PDCCH candidates of the third PDCCH monitoring constrain.

The maximum number of non-overlapped CCEs shown in Table 2A is the maximum number of non-overlapped CCEs of the third PDCCH monitoring constrain.

In accordance with some standards including 3GPP 38.213 entitled "NR; Physical layer procedures for control" Table 1 provides the maximum number of PDCCH candidates, $M_{PDCCH}^{max,slot,\mu}$, per slot for a UE in a downlink bandwidth part (DL BWP) with sub-carrier spacing (SCS) configuration $\mu \in \{0,1,2,3\}$ for operation with a single serving cell.

TABLE 1

| $\mu$ | Maximum number of PDCCH candidates per slot and per serving cell $M_{PDCCH}^{max,\ slot,\ \mu}$ |
| --- | --- |
| 0 | 44 |
| 1 | 36 |
| 2 | 22 |
| 3 | 20 |

Table 1A provides the maximum number of PDCCH candidates, $M_{PDCCH}^{max,(X,Y),\mu}$, per span for a UE in a DL BWP with SCS configuration $\mu \in \{0, 1\}$ for operation with a single serving cell.

TABLE 1A

| | Maximum number of $M_{PDCCH}^{max,\ (X,\ Y),\ \mu}$ of PDCCH candidates per span for combination (X, Y) and per serving cell | | |
| --- | --- | --- | --- |
| $\mu$ | (2, 2) | (4, 3) | (7, 3) |
| 0 | 14 | 28 | 44 |
| 1 | 12 | 24 | 36 |

Table 2 provides the maximum number of non-overlapped CCEs, $C_{PDCCH}^{max,slot,\mu}$, for a DL BWP with SCS configuration $\mu \in \{0,1,2,3\}$ that a UE is expected to monitor corresponding PDCCH candidates per slot for operation with a single serving cell.

TABLE 2

| $\mu$ | Maximum number of non-overlapped CCEs per slot and per serving cell $C_{PDCCH}^{max,\ slot,\ \mu}$ |
| --- | --- |
| 0 | 56 |
| 1 | 56 |
| 2 | 48 |
| 3 | 32 |

Table 2A provides the maximum number of non-overlapped CCEs, $C_{PDCCH}^{max,(X,Y),\mu}$, for a DL BWP with SCS configuration $\mu \in \{0, 1\}$ that a UE is expected to monitor corresponding PDCCH candidates per span for combination (X, Y) operation with a single serving cell.

TABLE 2A

| | Maximum number $C_{PDCCH}^{max,\ slot,\ \mu}$ of non-overlapped CCEs per span for combination (X, Y) and per serving cell | | |
| --- | --- | --- | --- |
| $\mu$ | (2, 2) | (4, 3) | (7, 3) |
| 0 | 18 | 36 | 56 |
| 1 | 18 | 36 | 56 |

In this example embodiment, the resource unit of the first PDCCH monitoring constraint is the same with the resource unit of the second PDCCH monitoring constraint.

In this embodiment, for subcarrier spacing of 15/30 KHz, the maximum number of PDCCH candidates of the first PDCCH monitoring constraint is the same with the maximum number of PDCCH candidates of the third PDCCH monitoring constraint for combination (X,Y)=(2,2) or (4,3).

In this embodiment, for subcarrier spacing of 15/30 KHz, the maximum number of non-overlapped CCEs of the first PDCCH monitoring constraint is the same with the maximum number of non-overlapped CCEs of the third PDCCH monitoring constraint for combination (X,Y)=(2,2) or (4,3).

In this embodiment, the maximum number of monitored PDCCH candidates and/or non-overlapped CCEs of the first PDCCH monitoring constraint is relaxed compared to the second PDCCH monitoring constraint.

In this embodiment, the resource unit where PDCCH candidates is monitored of the first PDCCH monitoring constraint is relaxed compared to the third PDCCH monitoring constraint.

Hence, the first PDCCH monitoring constraint is relaxed compared to the second PDCCH monitoring constraint or third PDCCH monitoring constraint.

First Condition

An example of first condition includes at least one of the following:
  UE category. In some embodiments, UE category can also be UE type, device category or device type;
  UE capability. Wherein the capability can be a UE capability with or without signaling;
  Higher layer signaling;
  resource of random access/beam failure recovery/radio link recovery procedure;
  DCI format;
  RNTI;
  Subcarrier spacing;
  frequency range; or
  Coverage enhancement operation In some embodiments, the first condition includes at least UE category/UE type, UE capability, and higher layer signaling.

In some embodiments, the first condition includes at least UE category/UE type, UE capability, and higher layer signaling, DCI format.

In some embodiments, the first condition includes at least UE category/UE type and higher layer signaling.

In some embodiments, the first condition includes at least UE capability and higher layer signaling.

In some embodiments, the first condition includes at least UE category/UE type, UE capability, and higher layer signaling, frequency range.

In some embodiments, the first condition includes at least UE category/UE type, UE capability, and higher layer signaling, DCI format, RNTI.

Examples of UE Categories

For a first UE category, the maximum number of PDCCH candidates and/or non-overlapped CCEs within the resource unit fulfills the first PDCCH monitoring constraint.

For a second UE category, the maximum number of PDCCH candidates and/or non-overlapped CCEs within the resource unit fulfills the second or third PDCCH monitoring constraint.

In some embodiments, the UE category is determined by a set of UE capabilities. In some embodiments, the UE capability includes at least one of the following Supported bandwidth Number of receiving antennas or transmitting antennas Maximum MIMO layer or maximum rank or number of ports Maximum number of HARQ process Maximum modulation order. In some embodiments, the maximum modulation order can be modulation order for UL or DL.

Maximum code rate

Maximum number of CORSET per DL BWP or serving cell

Maximum number of search space sets per DL BWP or serving cell

Maximum number of monitored PDCCH candidates within a span

Maximum number of non-overlapped CCEs within a span

Maximum number of DCI sizes

Processing timeline. In some embodiments, the processing timeline includes at least one of PDSCH decoding time or PUSCH preparation time.

Maximum number of bits received within a period. In some embodiments, the period can be one of TTI (transmission time interval), slot, millisecond, second. In some embodiments, the bits is the DL-SCH transport block bits.

Maximum number of bits of a transport block received within a period. In some embodiments, the period can be one of TTI (transmission time interval), slot, millisecond, second. In some embodiments, the transport block is a DL-SCH transport block.

Maximum number of transport blocks received within a period. In some embodiments, the period can be one of TTI (transmission time interval), slot, millisecond, second. In some embodiments, the transport block is a DL-SCH transport block.

Maximum number of bits transmitted within a period. In some embodiments, the period can be one of TTI (transmission time interval), slot, millisecond, second. In some embodiments, the bits is the UL-SCH transport block bits.

Maximum number of bits of a transport block transmitted within a period. In some embodiments, the period can be one of TTI (transmission time interval), slot, millisecond, second. In some embodiments, the transport block is a UL-SCH transport block.

Maximum number of transport blocks transmitted within a period. In some embodiments, the period can be one of TTI (transmission time interval), slot, millisecond, second. In some embodiments, the transport block is a UL-SCH transport block.

maximum data rate. In some embodiments, the maximum date rate is one of the maximum data rate of PUSCH transmission in a serving cell or serving cell group, or the maximum data rate of PDSCH reception in a serving cell or serving cell group.

total number of soft channel bits. In some embodiments, the total number of soft channel bits is the total number of soft channel bits available for HARQ processing.

Buffer size. In some embodiments, the buffer size is the total layer 2 buffer size. In some embodiments, the total layer 2 buffer size is defined as the sum of the number of bytes that the UE is capable of storing in the RLC transmission windows and RLC reception and reordering windows and also in PDCP reordering windows for all radio bearers.

TDD/FDD operation. In some embodiments, the TDD/FDD operation includes TDD operation, FDD operation or half-duplex FDD operation. In some embodiments, the half-duplex FDD operation includes at least one of type A half-duplex FDD operation or type B half-duplex FDD operation A maximum number of repetition times of a physical channel/signal In some embodiments, the UE category is determined by UE capability including at least supported bandwidth and number of receiving antennas.

In some embodiments, the UE category is determined by UE capability including at least supported bandwidth and number of transmitting antennas.

In some embodiments, the UE category is determined by UE capability including at least supported bandwidth, number of transmitting antennas, and number of receiving antennas.

In some embodiments, the UE category is determined by UE capability including at least supported bandwidth, and number of HARQ process.

In some embodiments, the UE category is determined by UE capability including at least supported bandwidth, number of transmitting antennas, and maximum number of HARQ process.

In some embodiments, the UE category is determined by UE capability including at least supported bandwidth, number of receiving antennas, and maximum number of monitored PDCCH candidates within a span.

In some embodiments, the UE category is determined by UE capability including at least supported bandwidth, maximum MIMO layer, and maximum modulation order.

In some embodiments, the UE category is determined by UE capability including at least supported bandwidth, maximum MIMO layer, maximum modulation order, and maximum code rate.

In some embodiments, the UE category is determined by UE capability including at least supported bandwidth, maximum MIMO layer, maximum modulation order, and maximum code rate, maximum data rate.

In some embodiments, the UE category is determined by UE capability including at least supported bandwidth, maximum data rate, buffer size.

In some embodiments, the UE category is determined by UE capability including at least supported bandwidth, number of receiving antennas, maximum modulation order, and supported half-duplex FDD operation type.

In some embodiments, the UE category is determined by UE capability including includes at least supported bandwidth, number of receiving antennas, and maximum modulation order.

In some embodiments, the UE category is determined by UE capability including at least supported bandwidth, maximum data rate, supported half-duplex FDD operation type.

In some embodiments, the UE category is determined by UE capability including at least supported bandwidth, maximum data rate, maximum modulation order.

In some embodiments, the UE category is determined by UE capability including at least supported bandwidth, maximum data rate, maximum modulation order, and maximum number of MIMO layers.

In some embodiments, the UE category is determined by UE capability including at least supported bandwidth, maximum data rate, maximum modulation order, maximum number of MIMO layers, and supported half-duplex FDD operation type.

In some embodiments, the UE category is determined by UE capability including at least supported bandwidth, maximum number of MIMO layers, supported half-duplex FDD operation type.

In some embodiments, the UE category is determined by UE capability including at least maximum number of bits received within a period, maximum number of bits of a transport block received within a period, maximum modulation order, total number of soft channel bits.

In some embodiments, the UE category is determined by UE capability including at least maximum number of bits transmitted within a period, maximum number of bits of a transport block transmitted within a period, maximum modulation order.

In some embodiments, the first UE category is a UE with reduced or limited capability, or NR light UE or UE with limited bandwidth or UE with coverage enhancement.

In some embodiments, when the UE category is of the first UE category, the maximum number of PDCCH candidates and/or non-overlapped CCEs within the resource unit fulfills the first PDCCH monitoring constraint.

In some embodiment, the first UE category is associated with a first UE capability.

In some embodiments, when the UE capability is of the first UE capability, the maximum number of PDCCH candidates and/or non-overlapped CCEs within the resource unit fulfills the first PDCCH monitoring constraint.

In some embodiments, the first UE capability includes at least one of the following capabilities:

The maximum bandwidth is no larger a first threshold

The number of receiving antenna is no larger than a second threshold

The number of transmission antenna is no larger than a third threshold

The maximum number of MIMO layers is no larger than a fourth threshold

The maximum number of ports is no larger than a fifth threshold

The maximum number of rank is no larger than a sixth threshold

Supports HD-FDD

The processing timeline fulfills a third requirement

The maximum modulation order is no larger than a seventh threshold

The maximum number of DCI sizes is no larger than an eighth threshold

The maximum number of search space sets per DL BWP or serving cell is no larger than a ninth threshold The maximum number of CORESET per DL BWP or serving cell is no larger than a tenth threshold The maximum data rate is no larger than an eleventh threshold The maximum number of HARQ process is no larger than a twelfth threshold The maximum code rate is no larger than a thirteenth threshold The maximum number of bits received within a period is no larger than a fourteenth threshold The maximum number of bits of a transport block received within a period is no larger than a fifteenth threshold The maximum number of bits transmitted within a period is no larger than a sixteenth threshold The maximum number of bits of a transport block transmitted within a period is no larger than a eighteenth threshold The maximum number of bits of a buffer size is no larger than a nineteenth threshold.

In some embodiments, the first UE category includes at least one of the following capabilities:

Supported bandwidth is 20 MHz for frequency range 1.

One or two receiving antennas. In some embodiments, the number of receiving antenna is determined by frequency range or subcarrier spacing. For example, for frequency range 1, the number of receiving antenna is 1. For example, for frequency range 1, the number of receiving antenna is 2.

Maximum MIMO layers is 4

Maximum modulation order is 4.

Supported half-duplex FDD operation type

UE Capability: Maximum Bandwidth

In some embodiments, if the supported maximum bandwidth is no larger a first threshold, the maximum number of PDCCH candidates and/or non-overlapped CCEs within the resource unit fulfills the first PDCCH monitoring constraint, wherein the first threshold is a positive number.

In some embodiments, if the supported maximum bandwidth is larger a first threshold, the maximum number of monitored PDCCH candidates and/or non-overlapped CCEs within the resource unit fulfills the second or third PDCCH monitoring constraint.

In some embodiments, the first threshold is associated with subcarrier spacing or frequency range. For example, the first threshold is no larger than 20 MHz for subcarrier spacing 15 kHz or 30 kHz. For example, the first threshold is no larger than 100 MHz for subcarrier spacing 60 kHz or 120 kHz. For example, the first threshold is no larger than 20 MHz for frequency range 1 (FR1). For example, the first threshold is no larger than 100 MHz for frequency range 2 (FR2).

Number of Receiving Antenna or Transmitting Antenna

In some embodiments, if the number of receiving antennas is no larger than a second threshold, the maximum number of PDCCH candidates and/or non-overlapped CCEs within the resource unit fulfills the first PDCCH monitoring constraint, wherein the second threshold is a positive number. For example, the second threshold is 2.

In some embodiments, if the number of receiving antennas is larger than a second threshold, the maximum number of PDCCH candidates and/or non-overlapped CCEs within the resource unit fulfills the second or third PDCCH monitoring constraint.

In some embodiments, the second threshold is associated with subcarrier spacing or frequency range or channel band.

In some embodiments, if the number of transmission antennas is no larger than a third threshold, the maximum number of PDCCH candidates and/or non-overlapped CCEs within the resource unit fulfills the first PDCCH monitoring constraint, wherein the third threshold is a positive number. For example, the third threshold is 1.

In some embodiments, if the number of transmission antennas is larger than a third threshold, the maximum number of PDCCH candidates and/or non-overlapped CCEs within the resource unit fulfills the second or third PDCCH monitoring constraint.

In some embodiments, the third threshold is associated with subcarrier spacing or frequency range or channel band.

Maximum Number of DL/UL MIMO Layer/Port Number/Rank

In some embodiments, if the maximum number of MIMO layers is no larger than a fourth threshold, the maximum number of PDCCH candidates and/or non-overlapped CCEs within the resource unit fulfills the first PDCCH monitoring constraint, wherein the fourth threshold is a positive number.

In some embodiments, if the maximum number of MIMO layers is larger than a fourth threshold, the maximum number of PDCCH candidates and/or non-overlapped CCEs within the resource unit fulfills the second or third PDCCH monitoring constraint.

In some embodiments, the maximum number of MIMO layers is the maximum number of DL MIMO layers or the maximum number of UL MIMO layers In some embodiments, the fourth threshold is associated with subcarrier spacing or frequency range or transmission direction. For example, fourth threshold is 4 for the maximum number of DL MIMO layers. The fourth threshold is 2 for the maximum number of UL MIMO layers.

In some embodiments, if the maximum number of ports is no larger than a fifth threshold or the maximum number of ports depends on UE capability, the maximum number of PDCCH candidates and/or non-overlapped CCEs within the resource unit fulfills the first PDCCH monitoring constraint, wherein the fifth threshold is a positive number.

In some embodiments, if the maximum number of ports is larger than a fifth threshold or UE is not required to report the supported maximum number of ports via UE capability signaling, the maximum number of PDCCH candidates and/or non-overlapped CCEs within the resource unit fulfills the second or third PDCCH monitoring constraint.

In some embodiments, the maximum number of ports is the maximum number of DM-RS ports or the maximum number of ports for PDSCH reception or the maximum number of ports for PUSCH transmission or the maximum number of ports of CSI-RS or the maximum number of ports of SRS.

In some embodiments, the fifth threshold is associated with subcarrier spacing or frequency range or transmission direction. For example, fifth threshold is 2 for downlink reception. The fifth threshold is 1 for uplink transmission.

In some embodiments, if the maximum number of rank is no larger than a sixth threshold or the maximum number of ranks depends on UE capability, the maximum number of PDCCH candidates and/or non-overlapped CCEs within the resource unit fulfills the first PDCCH monitoring constraint, wherein the sixth threshold is a positive number.

In some embodiments, if the maximum number of ranks is larger than a sixth threshold or UE is not required to report the supported maximum number of ranks via UE capability signaling, the maximum number of PDCCH candidates and/or non-overlapped CCEs within the resource unit fulfills the second or third PDCCH monitoring constraint.

In some embodiments, the sixth threshold is associated with subcarrier spacing or frequency range or transmission mode. Wherein the transmission mode includes codebook based transmission or non-codebook based transmission.

Half-Duplex Frequency Division Duplexing (HD-FDD)

In some embodiments, if UE supports HD-FDD, the maximum number of PDCCH candidates and/or non-overlapped CCEs within the resource unit fulfills the first PDCCH monitoring constraint.

In some embodiments, if UE does not support HD-FDD, the maximum number of PDCCH candidates and/or non-overlapped CCEs within the resource unit fulfills the second or third PDCCH monitoring constraint.

In some embodiments, the HD-FDD is type A HD-FDD or/and type B HD-FDD.

FIG. 4 shows an example of a Type A HD-FDD and a Type B HD-FDD.

Examples of HD-FDD

In an example, type A half-duplex FDD operation includes a first guard period. The first guard period includes at least one of the following:
- a guard period that includes not receiving a downlink period preceding an uplink period. In an example, the downlink period is the last part of a downlink period preceding an uplink period.
- a guard period that includes not transmit an uplink period following an downlink period. In an example, the uplink period is the beginning part of an uplink period following an downlink period.
- a guard period before an uplink period
- a guard period after a downlink period
- a guard period after a downlink period and before an uplink period
- a guard period between a downlink period and an uplink period In an example, type B half-duplex FDD operation includes a second guard period and a third guard period.

The second guard period includes at least one of the following:
- A guard period that includes not receiving a downlink period preceding an uplink period. In an example, the downlink period is the last part of a downlink period preceding an uplink period.
- A guard period that includes not transmitting an uplink period following a downlink period. In an example, the uplink period is the beginning part of an uplink period following a downlink period.
- a guard period before an uplink period
- a guard period after a downlink period
- a guard period after a downlink period and before an uplink period
- a guard period between a downlink period and an uplink period The third guard period includes at least one of the following:
- A guard period that includes not receiving a downlink period following an uplink period. In an example, the downlink period is the beginning part of a downlink period following an uplink period.

A guard period that includes not transmitting an uplink period preceding a downlink period. In an example, the uplink period is the last part of an uplink period preceding a downlink period.

a guard period before a downlink period a guard period after an uplink period a guard period after an uplink period and before a downlink period a guard period between an uplink period and a downlink period In some embodiments, at least one of the first guard period, the second guard period, or the third guard period includes not receiving/transmitting the flexible period.

In some embodiments, at least one of the first guard period, the second guard period, or the third guard period can be created by not receiving the DL period or not transmitting the UL period or not receiving/transmitting the flexible period In some embodiments, at least one of the first guard period, the second guard period, or the third guard period is associated with at least one of the following Higher layer signaling Subcarrier spacing Frequency range UE capability In some embodiments, UE is not required or does not expect to receive DL signal/channel or transmit UL signal/channel during the guard period.

In some embodiments, the uplink period is determined by at least one of the following
  a. Higher layer signaling. In some embodiments, the higher layer signaling includes the indication of the UL/DL configuration. In some example, the higher layer signaling includes at least one of the following indication: Periodicity; DL period—in some example, the DL period includes at least one of a number of slots with only downlink symbols and/or a number of downlink symbols; UL period—in some example, the UL period includes at least one of a number of slots with only uplink symbols and/or a number of uplink symbols. In some example, the higher layer signaling includes at least one of the following indication: Slot index; DL/UL symbols of the slot. In some embodiments, a period that is not indicated as DL or UL by the higher layer signaling is a flexible period. In some embodiments, the higher layer signaling includes at least one of tdd-UL-DL-ConfigurationCommon. or tdd-UL-DL-ConfigurationDedicated. The tdd-UL-DL-ConfigurationCommon is used to a cell-specific UL/DL configuration. The tdd-UL-DL-ConfigurationDedicated is used to a UE-specific UL/DL configuration. In 3GPP Release 15/16, tdd-UL-DL-ConfigurationCommon and tdd-UL-DL-ConfigurationDedicated is only used for TDD deployment. With the introduction of HD-FDD, tdd-UL-DL-ConfigurationCommon and tdd-UL-DL-ConfigurationDedicated can be reused to indicate the UL/DL configuration.
  b. slot format indicator (SFI) indicated by DCI. In an example, the DCI includes DCI format 2_0
  c. PUSCH indicated by higher layer signaling or DCI.
  d. PUCCH indicated by higher layer signaling or DCI.
  e. PRACH occasion
  f. UL reference signal indicated by higher layer signaling or DCI. In some embodiments, the UL reference signal includes SRS.

In some embodiments, the downlink period is determined by at least one of the following
  a. Higher layer signaling. In some embodiments, the higher layer signaling includes the indication of the UL/DL configuration. In some example, the higher layer signaling includes at least one of the following indication: Periodicity; DL period. In some example, the DL period includes at least one of a number of slots with only downlink symbols and/or a number of downlink symbols; UL period. In some example, the UL period includes at least one of a number of slots with only uplink symbols and/or a number of uplink symbols. In some example, the higher layer signaling includes at least one of the following indication: Slot index; DL/UL symbols of the slot. In some embodiments, a period that is not indicated as DL or UL by the higher layer signaling is a flexible period. In some embodiments, the higher layer signaling includes at least one of tdd-UL-DL-ConfigurationCommon. or tdd-UL-DL-ConfigurationDedicated.
  b. slot format indicator (SFI) indicated by DCI. In an example, the DCI includes DCI format 2_0.
  c. PDSCH indicated by higher layer signaling or DCI.
  d. PDCCH indicated by higher layer signaling
  e. DL reference signal indicated by higher layer signaling or DCI. In some embodiments, the DL reference signal includes at least one of CSI-RS, SRS, PRS,SS/PBCH (synchronization signal/PBCH). In some embodiments, the SRS is used for cross-link interference measurement or positioning. In some embodiments, the PRS is reference signal for positioning.

In some embodiments, when condition-A is fulfilled, a first or second guard includes at least one of the following,
  a guard period that includes not receiving a downlink period preceding an uplink period. In an example, the downlink period is the last part of a downlink period preceding an uplink period.
  a guard period before an uplink period
  a guard period after a downlink period and before an uplink period
  a guard period between a downlink period and an uplink period In some embodiments, when condition-B is fulfilled, a third guard includes at least one of the following,
  A guard period that includes not receiving a downlink period following an uplink period. In an example, the downlink period is the beginning part of a downlink period following an uplink period.
  a guard period after an uplink period
  a guard period after an uplink period and before a downlink period
  a guard period between an uplink period and a downlink period In some embodiments, when condition-C is fulfilled, a first or second guard includes at least one of the following,
  a guard period that includes not transmit an uplink period following an downlink period. In an example, the uplink period is the beginning part of an uplink period following a downlink period.
  a guard period before an uplink period
  a guard period after a downlink period and before an uplink period
  a guard period between a downlink period and an uplink period In some embodiments, when condition-D is fulfilled, a third guard includes at least one of the following, A guard period includes not transmitting an uplink period preceding a downlink period. In an example, the uplink period is the last part of an uplink period preceding a downlink period.
   a guard period before a downlink period
   a guard period after an uplink period and before a downlink period
   a guard period between an uplink period and a downlink period In some embodiments, at least one of the condition-A, condition-B, condition-C, or condition-D is associated with at least one of the determination of the uplink/downlink period, length of DL/UL period, length of the guard period.

In some embodiments, the condition-A and/or condition B is associated with at least one of the following.
   an uplink period that is determined by UL/DL configuration indicated by RRC signaling
   an uplink period that is determined by PRACH transmission, and a downlink period that is indicated by DCI format 2_0 or PDSCH/DL reference signal transmission indicated by higher layer signaling/DCI
   an uplink period that is indicated by DCI format 2_0, and a downlink period that is indicated by PDSCH/DL reference signal reception indicated by higher layer signaling/DCI
   an uplink period that is determined by PUSCH/PUCCH/UL reference signal indicated by DCI, and the downlink period that is determined by PDSCH/DL reference signal reception indicated by higher layer signaling
   A downlink period that is determined by PDSCH//DL reference signal indicated by higher layer signaling, and also indicated as "uplink" or "flexible" by DCI format 2_0.

In some embodiments, the condition-C and/or condition-D is associated with at least one of the following.
   a downlink period that is determined by UL/DL configuration indication conveyed by RRC signaling
   a downlink period that is determined by SSB
   a downlink period that is determined by CORESET 0/search space set 0
   a downlink period that is indicated by DCI format 2_0, and an uplink period that is determined by PUSCH/PUCCH/UL reference signal transmission indicated by higher layer signaling/DCI
   a downlink period that is determined by PDSCH/DL reference signal reception indicated by DCI, and an uplink period that is determined by PUSCH/PUCCH/UL reference signal transmission indicated by higher layer signaling
   An uplink period that is determined by PUSCH/PUCCH/UL reference signal transmission indicated by higher layer signaling, and also indicated as "downlink" or "flexible" by DCI format 2_0

Processing Timeline

In some embodiments, if the processing timeline fulfills a third requirement, the maximum number of PDCCH candidates and/or non-overlapped CCEs within the resource unit fulfills the first PDCCH monitoring constraint.

In some embodiments, if the processing timeline fulfills a first or second requirement, the maximum number of PDCCH candidates and/or non-overlapped CCEs within the resource unit fulfills the second or third PDCCH monitoring constraint.

In some embodiments, the processing timeline is at least one of the CSI computation delay requirement, PUSCH preparation time, or PDSCH decoding time.

In some embodiments, the third requirement is associated with the type of processing timeline.

In some embodiments, the first requirement is PDSCH processing time for PDSCH processing capability 1 or CSI computation delay requirement 1 or PUSCH preparation time for PUSCH timing capability 1. In some embodiments, the second requirement is PDSCH processing time for PDSCH processing capability 2 or CSI computation delay requirement 2 or PUSCH preparation time for PUSCH timing capability 2.

Example of PDSCH Processing Time for PDSCH Processing Capability 1

| | PDSCH decoding time $N_1$ [symbols] | |
| --- | --- | --- |
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1, 0}$ |
| 1 | 10 | 13 |
| 2 | 17 | 20 |
| 3 | 20 | 24 |

Example of PDSCH Processing Time for PDSCH Processing Capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
| --- | --- |
| 0 | 3 |
| 1 | 4.5 |
| 2 | 9 for frequency range 1 |

Example of CSI Computation Delay Requirement 1

| | $Z_1$ [symbols] | |
| --- | --- | --- |
| $\mu$ | $Z_1$ | $Z'_1$ |
| 0 | 10 | 8 |
| 1 | 13 | 11 |
| 2 | 25 | 21 |
| 3 | 43 | 36 |

Example of CSI Computation Delay Requirement 2

| | $Z_1$ [symbols] | | $Z_2$ [symbols] | | $Z_3$ [symbols] | |
| --- | --- | --- | --- | --- | --- | --- |
| $\mu$ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | min(44, $X_2 + KB_1$) | $X_2$ |
| 3 | 97 | 85 | 152 | 140 | min(97, $X_3 + KB_2$) | $X_3$ |

Example of PUSCH Preparation Time for PUSCH Timing Capability 1

| $\mu$ | PUSCH preparation time $N_2$ [symbols] |
|---|---|
| 0 | 10 |
| 1 | 12 |
| 2 | 23 |
| 3 | 36 |

Example of PUSCH Preparation Time for PUSCH Timing Capability 2

| $\mu$ | PUSCH preparation time $N_2$ [symbols] |
|---|---|
| 0 | 5 |
| 1 | 5.5 |
| 2 | 11 for frequency range 1 |

Maximum Modulation Order

In some embodiments, if the maximum modulation order is no larger than a seventh threshold, the maximum number of PDCCH candidates and/or non-overlapped CCEs within the resource unit fulfills the first PDCCH monitoring constraint, wherein the seventh threshold is a positive number. In an example, the seventh threshold is 6.

In some embodiments, if the maximum modulation order is larger than a seventh threshold, the maximum number of PDCCH candidates and/or non-overlapped CCEs within the resource unit fulfills the second or third PDCCH monitoring constraint.

In some embodiments, the maximum modulation order is the maximum modulation order for PDSCH reception or the maximum modulation order for PUSCH transmission.

In some embodiments, the seventh threshold is associated with subcarrier spacing or frequency range or transmission direction.

Maximum Number of DCI Sizes

In some embodiments, if the maximum number of DCI sizes is no larger than an eighth threshold, the maximum number of PDCCH candidates and/or non-overlapped CCEs within the resource unit fulfills the first PDCCH monitoring constraint, wherein the eighth threshold is a positive number. For example, the eighth threshold is 3.

In some embodiments, if the maximum number of DCI sizes is larger than an eighth threshold, the maximum number of PDCCH candidates and/or non-overlapped CCEs within the resource unit fulfills the second or third PDCCH monitoring constraint.

In some embodiments, the eighth threshold is associated with subcarrier spacing or frequency range or transmission direction or RNTI.

Search Space Set

In some embodiments, if the maximum number of search space sets per DL BWP or serving cell is no larger than a ninth threshold, the maximum number of PDCCH candidates and/or non-overlapped CCEs within the resource unit fulfills the first PDCCH monitoring constraint, wherein the ninth threshold is a positive number. For example, the ninth threshold is 5.

In some embodiments, if the maximum number of search space sets per DL BWP or serving cell is larger than a ninth threshold, the maximum number of PDCCH candidates and/or non-overlapped CCEs within the resource unit fulfills the second or third PDCCH monitoring constraint.

In some embodiments, the ninth threshold is associated with subcarrier spacing or frequency range or transmission direction or RNTI.

In some embodiments, if the search space set is common search space, the maximum number of PDCCH candidates and/or non-overlapped CCEs within the resource unit fulfills the first PDCCH monitoring constraint.

In some embodiments, if the search space set is UE specific search space, the maximum number of PDCCH candidates and/or non-overlapped CCEs within the resource unit fulfills the second or third PDCCH monitoring constraint.

CORESET

In some embodiments, if the maximum number of CORESET per DL BWP or serving cell is no larger than a tenth threshold, the maximum number of PDCCH candidates and/or non-overlapped CCEs within the resource unit fulfills the first PDCCH monitoring constraint, wherein the tenth threshold is a positive number. In some embodiments, the maximum number of CORSET is for one DL BWP or for one serving cell. For example, the tenth threshold is 2.

In some embodiments, if the maximum number of CORESET per DL BWP or serving cell is larger than a tenth threshold, the maximum number of PDCCH candidates and/or non-overlapped CCEs within the resource unit fulfills the second or third PDCCH monitoring constraint.

In some embodiments, the tenth threshold is associated with subcarrier spacing or frequency range.

Maximum Data Rate

In some embodiments, if the maximum data rate is no larger than an eleventh threshold, the maximum number of PDCCH candidates and/or non-overlapped CCEs within the resource unit fulfills the first PDCCH monitoring constraint, wherein the eleventh threshold is a positive number.

In some embodiments, if the maximum number of CORESET is larger than an eleventh threshold, the maximum number of PDCCH candidates and/or non-overlapped CCEs within the resource unit fulfills the second or third PDCCH monitoring constraint.

In some embodiments, the eleventh threshold is associated with UE capability.

In some embodiments, the maximum data rate is at least one of maximum data rate for DL-SCH or UL-SCH.

Maximum Number of HARQ Processes

In some embodiments, if the maximum number of HARQ process is no larger than a twelfth threshold, the maximum number of PDCCH candidates and/or non-overlapped CCEs within the resource unit fulfills the first PDCCH monitoring constraint, wherein the twelfth threshold is a positive number.

In some embodiments, if the maximum number of HARQ process is larger than a twelfth threshold, the maximum number of PDCCH candidates and/or non-overlapped CCEs within the resource unit fulfills the second or third PDCCH monitoring constraint.

In some embodiments, the eleventh threshold is associated with UE capability, or transmission direction.

Maximum Code Rate

In some embodiments, if the maximum code rate is no larger than a thirteenth threshold, the maximum number of PDCCH candidates and/or non-overlapped CCEs within the resource unit fulfills the first PDCCH monitoring constraint, wherein the eleventh thirteenth is a positive number.

In some embodiments, if the maximum code rate is larger than a thirteenth threshold, the maximum number of PDCCH candidates and/or non-overlapped CCEs within the resource unit fulfills the second or third PDCCH monitoring constraint.

In some embodiments, the thirteenth threshold is associated with UE capability, or transmission direction. In some embodiments, the thirteenth threshold is associated with a selection of a Low-density Parity Check Code (LPDC) base graph. For example, the thirteenth threshold value is $R+\Delta$, wherein R is a code rate associated with the selection of a LPDC base graph, and wherein $-\frac{1}{8} \leq \Delta \leq \frac{1}{8}$. For example, R=0.67. Currently, there are two base graphs (i.e., base graph 1 and base graph 2) defined in the 3GPP standard. Wherein the encoding and decoding operation with base graph 2 have lower complexity. The selection of LDPC base graph is based on payload size of a transport block and the code rate. When payload size is no larger than 3824 and code rate is no larger than 0.67, LDPC base graph 2 is used. In some embodiments, the maximum code rate is restricted to the thirteenth threshold such that only LDPC base graph 2 is used.

Maximum Number of Bits of a Buffer Size

In some embodiments, if the maximum number of bits of a buffer size is no larger than a nineteenth threshold, the maximum number of PDCCH candidates and/or non-overlapped CCEs within the resource unit fulfills the first PDCCH monitoring constraint, wherein the threshold is a positive number.

In some embodiments, if the maximum number of bits of a buffer size is larger than a nineteenth threshold, the maximum number of PDCCH candidates and/or non-overlapped CCEs within the resource unit fulfills the second or third PDCCH monitoring constraint.

The First Condition: Higher Layer Signaling

In some embodiments, if a first higher layer signaling is configured or a first higher layer signaling is set to state-1, the maximum number of PDCCH candidates and/or non-overlapped CCEs within the resource unit fulfills the first PDCCH monitoring constraint.

In some embodiments, if a first higher layer signaling is not configured or a first higher layer signaling is not set to state-1, the maximum number of PDCCH candidates and/or non-overlapped CCEs within the resource unit fulfills the second or third PDCCH monitoring constraint.

In some embodiments,
if a first higher layer signaling is not configured or a first higher layer signaling is not set to state-1, and,
a second higher layer signaling is set to state-2-1 or the second higher layer signaling is not configured, the maximum number of PDCCH candidates and/or non-overlapped CCEs within the resource unit fulfills the second PDCCH monitoring constraint.

In some embodiments,
if a first higher layer signaling is not configured or a first higher layer signaling is not set to state-1, and,
a second higher layer signaling is set to state-2-2, the maximum number of PDCCH candidates and/or non-overlapped CCEs within the resource unit fulfills the third PDCCH monitoring constraint.

In some embodiments, if none of the first, second or third higher layer signaling is configured, the maximum number of PDCCH candidates and/or non-overlapped CCEs within the resource unit fulfills the second PDCCH monitoring constraint.

In some embodiments, the second higher layer signaling is "PDCCHMonitoringCapabilityConfig". The state-2-1 is "R15 PDCCH monitoring capability". The state-2-2 is "R16 PDCCH monitoring capability".

[Note: The RRC signaling is used to indicate UE to obtain the an indication to monitor PDCCH on the serving cell for a maximum number of PDCCH candidates and non-overlapping CCEs.

If PDCCHMonitoringCapabilityConfig=R15 PDCCH monitoring capability, UE monitor PDCCH on the serving cell for a maximum number of PDCCH candidates and non-overlapping CCEs according to table XX and table XX respectively, which corresponds to the second PDCCH monitoring constraint.

If PDCCHMonitoringCapabilityConfig=R16 PDCCH monitoring capability, UE monitor PDCCH on the serving cell for a maximum number of PDCCH candidates and non-overlapping CCEs according to table XX and table XX respectively, which corresponds to the third PDCCH monitoring constraint.

In this embodiment, an additional RRC signaling, i.e., the first higher layer signaling is introduced to indicate whether the first PDCCH monitoring constraint is applied or not.

In some embodiments, if a third higher layer signaling is set to
state-3-1, the maximum number of PDCCH candidates and/or non-overlapped CCEs within the resource unit fulfills the first PDCCH monitoring constraint.
state-3-2, the maximum number of PDCCH candidates and/or non-overlapped CCEs within the resource unit fulfills the second PDCCH monitoring constraint.
state-3-3, the maximum number of PDCCH candidates and/or non-overlapped CCEs within the resource unit fulfills the third PDCCH monitoring constraint.

In some embodiments, if the third higher layer signaling is not configured, the maximum number of PDCCH candidates and/or non-overlapped CCEs within the resource unit fulfills the second PDCCH monitoring constraint.

In some embodiments, the third higher layer signaling is "PDCCHMonitoringCapabilityConfig". The state-3-2 is "R15 PDCCH monitoring capability". The state-3-3 is "R16 PDCCH monitoring capability".

[Note: The RRC signaling is used to indicate UE to obtain the an indication to monitor PDCCH on the serving cell for a maximum number of PDCCH candidates and non-overlapping CCEs.

If PDCCHMonitoringCapabilityConfig=R15 PDCCH monitoring capability, UE monitor PDCCH on the serving cell for a maximum number of PDCCH candidates and non-overlapping CCEs according to table XX and table XX respectively, which corresponds to the second PDCCH monitoring constraint.

If PDCCHMonitoringCapabilityConfig=R16 PDCCH monitoring capability, UE monitor PDCCH on the serving cell for a maximum number of PDCCH candidates and non-overlapping CCEs according to table XX and table XX respectively, which corresponds to the third PDCCH monitoring constraint.

In this embodiment, the signaling "PDCCHMonitoringCapabilityConfig" is extended to indicate the first, second or third PDCCH monitoring constraint First Condition Includes a Resource of Random Access/ Radio Link Recovery/Beam Failure Recovery In some embodiments, for UE with a first set of resources of random access procedure or radio link recovery or beam failure recovery, the maximum number of PDCCH candidates and/or non-overlapped CCEs within the resource unit fulfills the first PDCCH monitoring constraint.

In some embodiments, for UE with a second set of resource of random access or radio link recovery or beam failure recovery, the maximum number of PDCCH candidates and/or non-overlapped CCEs within the resource unit fulfills the second or third PDCCH monitoring constraint.

In some embodiments, the first set of resource is predefined. In some embodiments, the second set of resource is indicated by higher layer signaling.

In some embodiments, the a first set of resource and the second set of resource are indicated by different higher layer signaling or indicated by different information elements (IE) in system information.

In some embodiments, the first resource is associated with coverage enhancement operation.

In some embodiments, the resource for random access or radio link recovery or beam failure recovery includes at least one of
- a preamble sequence.
- a logical root sequence index.
- a preamble format.
- a association between PRACH occasion and SS/PBCH block.
- a time or/and frequency resource for PRACH or preamble transmission.
- a PRACH configuration index.

In some embodiments, the first resource for random access or radio link recovery or beam failure recovery includes at least one of
- a information field in RAR (random access response). In some embodiments, the information field in RAR is associated with or includes a repetition times for message 3 or message 4.
- a repetitive transmission of message 3 or message 4 or message B. Wherein the message B is PDSCH with CRC scrambled by MsgB-RNTI.

First Condition Includes at Least RNTI

In some embodiments, if a first range of RNTI value is used to scramble the CRC of DCI, the maximum number of PDCCH candidates and/or non-overlapped CCEs within the resource unit fulfills the first PDCCH monitoring constraint, In some embodiments, if a second range of RANTI value is used to scramble the CRC of DCI, the maximum number of PDCCH candidates and/or non-overlapped CCEs within the resource unit fulfills the second or third PDCCH monitoring constraint.

In some embodiments, the RNTI includes at least one of C-RNTI, RA-RNTI,TC-RNTI.

In some embodiments, if a first set of RNTI is used to scramble the CRC of DCI, the maximum number of PDCCH candidates and/or non-overlapped CCEs within the resource unit fulfills the first PDCCH monitoring constraint, In some embodiments, if a second set of RANTI is used to scramble the CRC of DCI, the maximum number of PDCCH candidates and/or non-overlapped CCEs within the resource unit fulfills the second or third PDCCH monitoring constraint.

First Condition Includes a DCI Format

In some embodiments, if a first set of DCI formats is not supported, the maximum number of PDCCH candidates and/or non-overlapped CCEs within the resource unit fulfills the first PDCCH monitoring constraint, In some embodiments, if a first set of DCI formats is supported, the maximum number of PDCCH candidates and/or non-overlapped CCEs within the resource unit fulfills the second or third PDCCH monitoring constraint.

In some embodiments, the first set of DCI formats includes at least one of DCI format 0_1 or DCI format 1_1.

In some embodiments, if a second set of DCI formats is supported, the maximum number of PDCCH candidates and/or non-overlapped CCEs within the resource unit fulfills the first PDCCH monitoring constraint, In some embodiments, if a second set of DCI formats is not supported, the maximum number of PDCCH candidates and/or non-overlapped CCEs within the resource unit fulfills the second or third PDCCH monitoring constraint.

In some embodiments, the second set of DCI formats includes at least one of DCI format 0_2 or DCI format 1_2. In some embodiments, the second set of DCI formats includes at least information field of repetition times of physical channel/signal.

FIG. 5 shows an example of a method of wireless communication, in accordance with some example embodiments. At 510, the method includes determining, by a wireless device, a control channel monitoring constraint based on a first condition. At 520, the method includes monitoring, by the wireless device, one or more control channel candidates at a control channel monitoring occasion, wherein a maximum number of the control channel candidates within a resource unit or a maximum number of non-overlapped control channel elements within a resource unit satisfies the control channel monitoring constraint.

FIG. 6 shows another example of a method of wireless communication, in accordance with some example embodiments. At 610, the method includes determining, by a network node, a control channel monitoring constraint based on a first condition. At 620, the method includes transmitting, by the network node, one or more control channel candidates satisfying the control channel monitoring constraint. A maximum number of the control channel candidates within a resource unit or the maximum number of non-overlapped control channel elements within a resource unit satisfies the control channel monitoring constraint.

Figure 7:
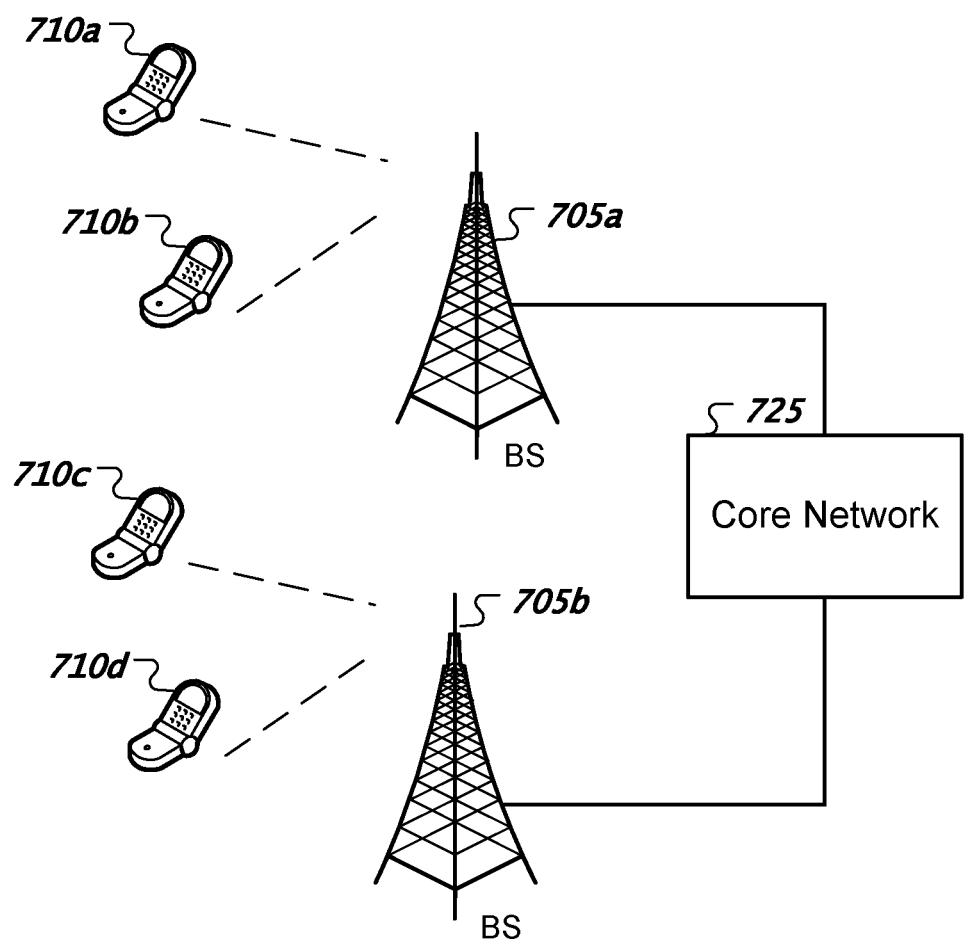
FIG. 7 shows a wireless communication system based on some example embodiments of the disclosed technology.

FIG. 7 shows an example of a wireless communication system 700 where techniques in accordance with one or more embodiments of the present technology can be applied. A wireless communication system 700 can include one or more base stations (BSs) 705*a*, 705*b*, one or more wireless devices 710*a*, 710*b*, 710*c*, 710*d*, and a core network 725. A base station 705*a*, 705*b* can provide wireless service to wireless devices 710*a*, 710*b*, 710*c* and 710*d* in one or more wireless sectors. In some implementations, a base station 705*a*, 705*b* includes directional antennas to produce two or more directional beams to provide wireless coverage in different sectors.

The core network 725*c* an communicate with one or more base stations 705*a*, 705*b*. The core network 725 provides connectivity with other wireless communication systems and wired communication systems. The core network may include one or more service subscription databases to store information related to the subscribed wireless devices 710*a*, 710*b*, 710*c*, and 710*d*. A first base station 705*a* can provide wireless service based on a first radio access technology, whereas a second base station 705*b* can provide wireless service based on a second radio access technology. The base stations 705*a* and 705*b* may be co-located or may be separately installed in the field according to the deployment scenario. The wireless devices 710*a*, 710*b*, 710*c*, and 710*d* can support multiple different radio access technologies. The techniques and embodiments described in the present document may be implemented by the base stations or wireless devices described in the present document.

Figure 8:
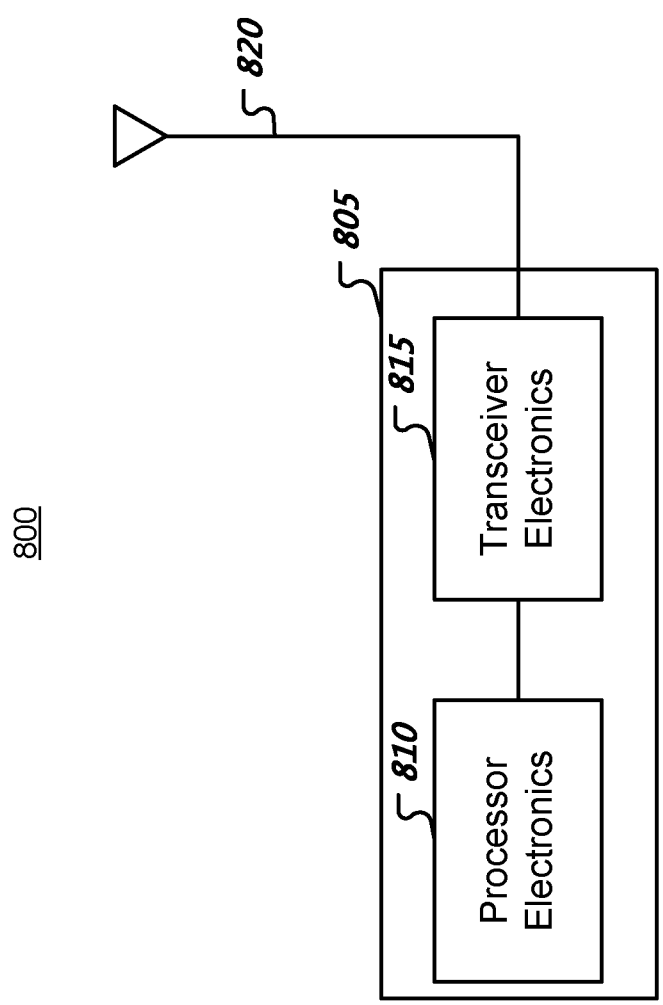
FIG. 8 shows a block diagram of a portion of a radio system based on some example embodiments of the disclosed technology.

FIG. 8 is a block diagram of a portion of a radio station in accordance with one or more embodiments of the present technology can be applied. A radio 805 such as a base station (e.g., a network node) or a wireless device (or UE or a wireless node) can include processor electronics 810 such as a microprocessor that implements one or more of the wireless techniques presented in this document. The radio 805 can include transceiver electronics 815 to send and/or receive wireless signals over one or more communication interfaces such as antenna 820. The radio 805 can include other communication interfaces for transmitting and receiving data. Radio 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio 805. In some embodiments, the radio 805 may be configured to perform the methods described in this document.

The technical solutions described by the following clauses may be preferably implemented by some embodiments.

Clause 1. A method of wireless communication, comprising: determining, by a wireless device, a control channel monitoring constraint based on a first condition; and monitoring, by the wireless device, one or more control channel candidates at a control channel monitoring occasion, wherein a maximum number of the control channel candidates within a resource unit or a maximum number of non-overlapped control channel elements within a resource unit satisfies the control channel monitoring constraint.

Clause 2. The method of clause 1, wherein the control channel monitoring constraint is applied to an active search space set group in which a wireless device monitors the control channel or a predefined search space set of an active bandwidth part of a serving cell.

Clause 3. The method of clause 2, wherein the predefined search space set includes at least one of: a Type0-PDCCH common search space set, a Type0A-PDCCH common search space set, a Type1-PDCCH common search space set, a Type2-PDCCH common search space set, a Type3-PDCCH common search space set which is not associated with a search space set group identifier, or a wireless device-specific search space set which is not associated with the search space set group identifier.

Clause 4. The method of clause 1, wherein the resource unit of the control channel monitoring constraint is defined by at least one of a first span, an aggregation level, a search space type, a control resource set or a transmission direction, wherein the first span is in a unit of symbol, slot, millisecond, or half frame.

Clause 5. The method of clause 4, wherein the first span is less than or equal to a predetermined value and a gap between consecutive spans is determined by a start or end of two consecutive spans.

Clause 6. The method of claim 4, wherein the first span is determined by a first scaling factor and a second span.

Clause 7. The method of claim 1, wherein a maximum quantity of control channel candidates is determined by a second control channel monitoring constraint and a second scaling factor.

Clause 8. The method of clause 1, wherein a maximum quantity of non-overlapped control channel elements is determined by a maximum quantity of non-overlapped control channel elements in the second control channel monitoring constraint and a third scaling factor.

Clause 9. The method of clause 6, 7, or 8, wherein at least one of the first scaling factor, the second scaling factor, or the third scaling factor is determined by at least one of: a subcarrier spacing, a frequency range, a higher layer parameter, a downlink control information, or a wireless device capability.

Clause 10. The method of clause 9, wherein at least one of the first scaling factor, the second scaling factor, or the third scaling factor is indicated by higher layer parameter and/or downlink control information.

Clause 11. The method of clause 10, wherein the indicated scaling factor of at least one of the first scaling factor, the second scaling factor, or the third scaling factor is not applied until an application delay.

Clause 12. The method of clause 11, wherein the application delay is associated with at least one of: a subcarrier spacing, a frequency range, a minimum scheduling offset restriction, or a wireless device capability.

Clause 13. The method of clause 6, 7, or 8, wherein a default value of at least one of the first scaling factor, the second scaling factor, or the third scaling factor is applied when at least one of the following conditions is satisfied: after a radio resource control (RRC) reconfiguration, after a downlink bandwidth part is activated, before an indication of a scaling factor is received, more than one scaling factor is configured by a higher layer signaling, or expiration/start/restart of a timer.

Clause 14. The method of claim 1 or 4, wherein for a plurality of aggregation levels, the maximum quantity of the control channel candidates of an aggregation level and/or the maximum quantity of non-overlapped control channel elements of an aggregation level satisfies the control channel monitoring constraint.

Clause 15. The method of claim 1 or 4, wherein for a plurality of search space sets, the maximum quantity of the control channel candidates within a search space set and/or the maximum quantity of non-overlapped control channel elements within a search space set satisfies the control channel monitoring constraint.

Clause 16. The method of claim 1 or 4, wherein the maximum quantity of control channel candidates for a data scheduling of a transmission direction and/or the maximum quantity of non-overlapped control channel elements for a data scheduling of a transmission direction satisfies the control channel monitoring constraint.

Clause 17. The method of clause 1, wherein the first condition includes at least one of: a wireless device category, a wireless device capability, a higher layer signaling, a resource of a random-access procedure, a downlink control information, a radio network temporary identifier, a subcarrier spacing, a frequency range, or a coverage enhancement operation.

Clause 18. The method of clause 17, wherein the wireless device category is determined by a wireless device capability.

Clause 19. The method of clauses 17 or 18, wherein the wireless device capability includes one or more of: a maximum bandwidth, a quantity of receiving or transmitting antennas, a maximum quantity of multiple input multiple output layers, a port number, or a rank number, support of a half-duplex frequency division duplexing, a maximum modulation order, a maximum quantity of downlink control information sizes, a maximum quantity of search space sets, a maximum quantity of control resource sets, a maximum data rate, a maximum code rate, or a maximum number of bits of a buffer size.

Clause 20. The method of clause 19, wherein half-duplex frequency division duplexing operation includes at least one guard period created by not receiving during a downlink period, wherein the downlink period is before or subsequent to an uplink period.

Clause 21. The method of clause 19, wherein half-duplex frequency division duplexing operation includes at least one guard period created by not transmitting during an uplink period, wherein the uplink period is before or subsequent to a downlink period.

Clause 22. A method of wireless communication, comprising: determining, by a network node, a control channel monitoring constraint based on a first condition; and transmitting, by the network node, one or more control channel candidates satisfying the control channel monitoring constraint, wherein a maximum number of the control channel candidates within a resource unit or a maximum number of non-overlapped control channel elements within a resource unit satisfies the control channel monitoring constraint.

Clause 23. The method of clause 22, wherein the control channel monitoring constraint is applied to an active search space set group in which a wireless device monitors the control channel or a predefined search space set of an active bandwidth part of a serving cell.

Clause 24. The method of clause 23, wherein the predefined search space set includes at least one of: a Type0-PDCCH common search space set, a Type0A-PDCCH common search space set, a Type1-PDCCH common search space set, a Type2-PDCCH common search space set, a Type3-PDCCH common search space set which is not associated with a search space set group identifier, or a wireless device-specific search space set which is not associated with the search space set group identifier.

Clause 25. The method of clause 22, wherein the resource unit of the control channel monitoring constraint is defined by at least one of a first span, an aggregation level, a search space type, a control resource set or a transmission direction, wherein the first span is in a unit of symbol, slot, millisecond, or half frame.

Clause 26. The method of clause 25, wherein the first span is less than or equal to a predetermined value and a gap between consecutive spans is determined by a start or end of two consecutive spans.

Clause 27. The method of clause 25, wherein the first span is determined by a first scaling factor and a second span.

Clause 28. The method of clause 22, wherein a maximum quantity of control channel candidates is determined by a second control channel monitoring constraint and a second scaling factor.

Clause 29. The method of clause 22, wherein a maximum quantity of non-overlapped control channel elements is determined by a maximum quantity of non-overlapped control channel elements in the second control channel monitoring constraint and a third scaling factor.

Clause 30. The method of clause 27, 28, or 29, wherein at least one of the first scaling factor, the second scaling factor, or the third scaling factor is determined by at least one of: a subcarrier spacing, a frequency range, a higher layer parameter, a downlink control information, or a wireless device capability.

Clause 31. The method of clause 30, wherein at least one of the first scaling factor, the second scaling factor, or the third scaling factor is indicated by higher layer parameter and/or downlink control information.

Clause 32. The method of clause 31, wherein the indicated scaling factor of at least one of the first scaling factor, the second scaling factor, or the third scaling factor is not applied until an application delay.

Clause 33. The method of clause 32, wherein the application delay is associated with at least one of: a subcarrier spacing, a frequency range, a minimum scheduling offset restriction, or a wireless device capability.

Clause 34. The method of clause 27, 28, or 29 wherein a default value of at least one of the first scaling factor, the second scaling factor, or the third scaling factor is applied when at least one of the following conditions is satisfied: after a radio resource control (RRC) reconfiguration, after a downlink bandwidth part is activated, before an indication of a scaling factor is received, more than one scaling factor is configured by a higher layer signaling, or expiration/start/restart of a timer.

Clause 35. The method of claim 22 or 25, wherein for a plurality of aggregation levels, the maximum quantity of the control channel candidates of an aggregation level and/or the maximum quantity of non-overlapped control channel elements of an aggregation level satisfies the control channel monitoring constraint.

Clause 36. The method of claim 22 or 25, wherein for a plurality of search space sets, the maximum quantity of the control channel candidates within a search space set and/or the maximum quantity of non-overlapped control channel elements within a search space set satisfies the control channel monitoring constraint.

Clause 37. The method of claim 22 or 25, wherein the maximum quantity of control channel candidates for a data scheduling of a transmission direction and/or the maximum quantity of non-overlapped control channel elements for a data scheduling of a transmission direction satisfies the control channel monitoring constraint.

Clause 38. The method of clause 22, wherein the first condition includes at least one of: a wireless device category, a wireless device capability, a higher layer signaling, a resource of a random-access procedure, a downlink control information, a radio network temporary identifier, a subcarrier spacing, a frequency range, or a coverage enhancement operation.

Clause 39. The method of clause 38, wherein the wireless device category is determined by a wireless device capability.

Clause 40. The method of clauses 38 or 39, wherein the wireless device capability includes one or more of: a maximum bandwidth, a quantity of receiving or transmitting antennas, a maximum quantity of multiple input multiple output layers, a port number, or a rank number, support of a half-duplex frequency division duplexing, a maximum modulation order, a maximum quantity of downlink control information sizes, a maximum quantity of search space sets, a maximum quantity of control resource sets, a maximum data rate, a maximum code rate, or a maximum number of bits of a buffer size.

Clause 41. The method of clause 40, wherein half-duplex frequency division duplexing operation includes at least one guard period created by not transmitting during a downlink period, wherein the downlink period is before or subsequent to an uplink period.

Clause 42. The method of clause 40, wherein half-duplex frequency division duplexing operation includes at least one guard period created by not receiving during an uplink period, wherein the uplink period is before or subsequent to a downlink period.

Clause 43. An apparatus for wireless communication, comprising a processor, wherein the processor is configured to implements a method recited in any of claims 1 to 42.

Clause 44. A computer readable program storage medium having code stored thereon, the code, when executed by a processor, causing the processor to implement a method recited in any of clauses 1 to 42.

In the technical solutions described herein in clause format, the wireless node may be a UE such as a mobile phone or a tablet or any other device capable of wireless communication and the network node may be a networkside equipment such as a base station. FIG. 8 shows an example hardware platform for implementing the wireless node or the network node.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

What is claimed is:

1. A method of wireless communication, comprising:
    determining, by a wireless device, a control channel monitoring constraint based on a first condition; and
    monitoring, by the wireless device, one or more control channel candidates at a control channel monitoring occasion, wherein a maximum number of the one or more control channel candidates within a resource unit or a maximum number of non-overlapped control channel elements within the resource unit satisfies the control channel monitoring constraint,
    wherein the resource unit of the control channel monitoring constraint is defined by at least one of a first span, an aggregation level, a search space type, a control resource set or a transmission direction,
    wherein the first span is in a unit of symbol, slot, millisecond, or half frame,
    wherein the first span is determined by a first scaling factor and a second span,
    wherein the first scaling factor is determined by at least one of a subcarrier spacing, a frequency range, a higher layer parameter, a downlink control information, or a wireless device capability,
    wherein the first scaling factor is indicated by the higher layer parameter and/or the downlink control information,
    wherein the indicated scaling factor of the first scaling factor is not applied until an application delay, and
    wherein the application delay is associated with at least one of a subcarrier spacing, a frequency range, a minimum scheduling offset restriction, or a wireless device capability.

2. The method of claim 1, wherein the control channel monitoring constraint is applied to an active search space set group in which a wireless device monitors the control channel or a predefined search space set of an active bandwidth part of a serving cell.

3. The method of claim 2, wherein the predefined search space set includes at least one of:
    a Type0-PDCCH common search space set,
    a Type0A-PDCCH common search space set,
    a Type1-PDCCH common search space set,
    a Type2-PDCCH common search space set, a Type3-PDCCH common search space set which is not associated with a search space set group identifier, or a wireless device-specific search space set which is not associated with the search space set group identifier.

4. The method of claim 1, wherein a duration of the first span is less than or equal to a predetermined value and a gap between consecutive spans is determined by a start or end of two consecutive spans.

5. The method of claim 1, wherein a maximum quantity of control channel candidates is determined by a second control channel monitoring constraint and a second scaling factor.

6. The method of claim 1, wherein a maximum quantity of non-overlapped control channel elements is determined by a maximum quantity of non-overlapped control channel elements in the second control channel monitoring constraint and a third scaling factor.

7. The method of claim 1, wherein a default value of the first scaling factor is applied when at least one of the following conditions is satisfied:
after a radio resource control (RRC) reconfiguration,
after a downlink bandwidth part is activated,
before an indication of a scaling factor is received,
more than one scaling factor is configured by a higher layer signaling, or
expiration/start/restart of a timer.

8. The method of claim 1, wherein for a plurality of aggregation levels, the maximum quantity of the control channel candidates of an aggregation level and/or the maximum quantity of non-overlapped control channel elements of an aggregation level satisfies the control channel monitoring constraint.

9. The method of claim 1, wherein for a plurality of search space sets, the maximum quantity of the control channel candidates within a search space set and/or the maximum quantity of non-overlapped control channel elements within a search space set satisfies the control channel monitoring constraint.

10. The method of claim 1, wherein the maximum quantity of control channel candidates for a data scheduling of a transmission direction and/or the maximum quantity of non-overlapped control channel elements for a data scheduling of a transmission direction satisfies the control channel monitoring constraint.

11. The method of claim 1, wherein the first condition includes at least one of:
a wireless device category,
a wireless device capability,
a higher layer signaling,
a resource of a random-access procedure,
a downlink control information,
a radio network temporary identifier,
a subcarrier spacing,
a frequency range, or
a coverage enhancement operation.

12. The method of claim 11, wherein the wireless device category is determined by a wireless device capability.

13. The method of claim 11, wherein the wireless device capability includes one or more of:
a maximum bandwidth,
a quantity of receiving or transmitting antennas,
a maximum quantity of multiple input multiple output layers, a port number, or a rank number,
support of a half-duplex frequency division duplexing,
a maximum modulation order,
a maximum quantity of downlink control information sizes,
a maximum quantity of search space sets,
a maximum quantity of control resource sets,
a maximum data rate,
a maximum code rate, or
a maximum number of bits of a buffer size.

14. The method of claim 13, wherein half-duplex frequency division duplexing operation includes at least one guard period created by not receiving during a downlink period, wherein the downlink period is before or subsequent to an uplink period.

15. A wireless device for wireless communication comprising one or more processors configured to cause the wireless device to implement a method, the wireless device configured to:
determine a control channel monitoring constraint based on a first condition; and
monitor one or more control channel candidates at a control channel monitoring occasion, wherein a maximum number of the one or more control channel candidates within a resource unit or a maximum number of non-overlapped control channel elements within the resource unit satisfies the control channel monitoring constraint,
wherein the resource unit of the control channel monitoring constraint is defined by at least one of a first span, an aggregation level, a search space type, a control resource set or a transmission direction,
wherein the first span is in a unit of symbol, slot, millisecond, or half frame,
wherein the first span is determined by a first scaling factor and a second span,
wherein the first scaling factor is determined by at least one of a subcarrier spacing, a frequency range, a higher layer parameter, a downlink control information, or a wireless device capability,
wherein the first scaling factor is indicated by the higher layer parameter and/or the downlink control information,
wherein the indicated scaling factor of the first scaling factor is not applied until an application delay, and
wherein the application delay is associated with at least one of a subcarrier spacing, a frequency range, a minimum scheduling offset restriction, or a wireless device capability.

16. The wireless device of claim 15, wherein the control channel monitoring constraint is applied to an active search space set group in which a wireless device monitors the control channel or a predefined search space set of an active bandwidth part of a serving cell.

17. The wireless device of claim 16, wherein the predefined search space set includes at least one of:
a Type0-PDCCH common search space set,
a Type0A-PDCCH common search space set,
a Type1-PDCCH common search space set,
a Type2-PDCCH common search space set,
a Type3-PDCCH common search space set which is not associated with a search space set group identifier, or
a wireless device-specific search space set which is not associated with the search space set group identifier.

18. The wireless device of claim 15, wherein a duration of the first span is less than or equal to a predetermined value and a gap between consecutive spans is determined by a start or end of two consecutive spans.

19. The wireless device of claim 15, wherein a maximum quantity of control channel candidates is determined by a second control channel monitoring constraint and a second scaling factor.

20. The wireless device of claim 15, wherein a maximum quantity of non-overlapped control channel elements is determined by a maximum quantity of non-overlapped control channel elements in the second control channel monitoring constraint and a third scaling factor.

* * * * *